March 17, 1959 S. ROBERTS 2,877,672
DRILL PRESS JIGS AND ACCESSORIES THEREFOR
Filed Jan. 31, 1958 2 Sheets-Sheet 1
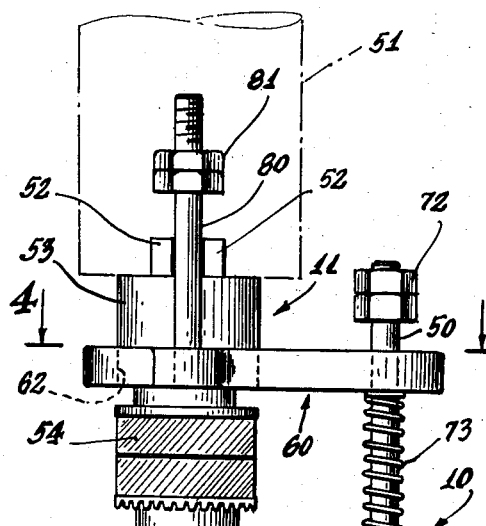
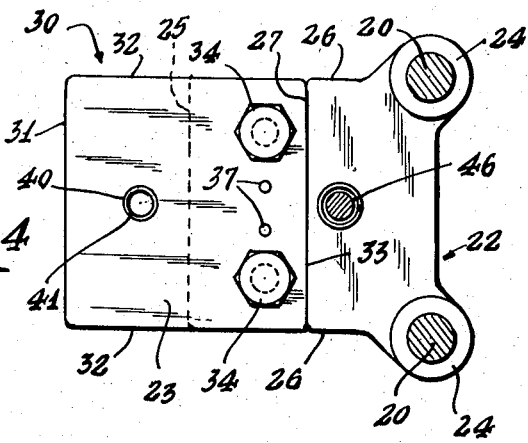
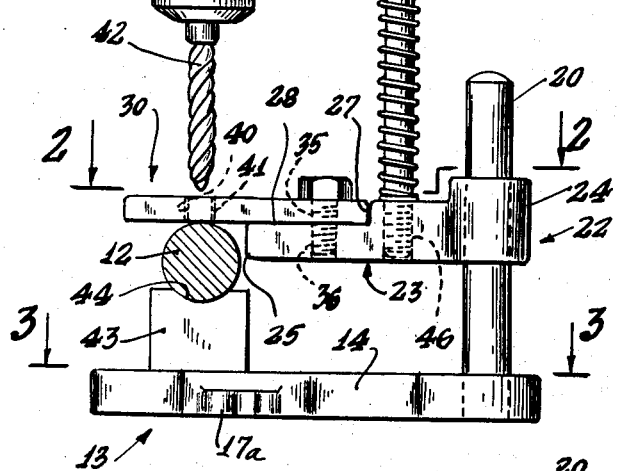
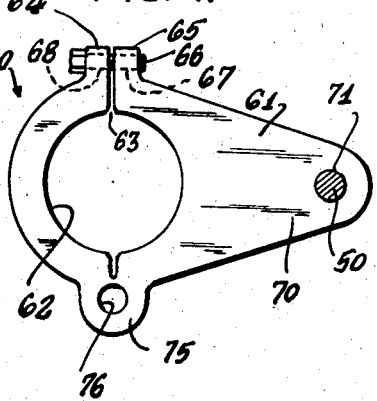
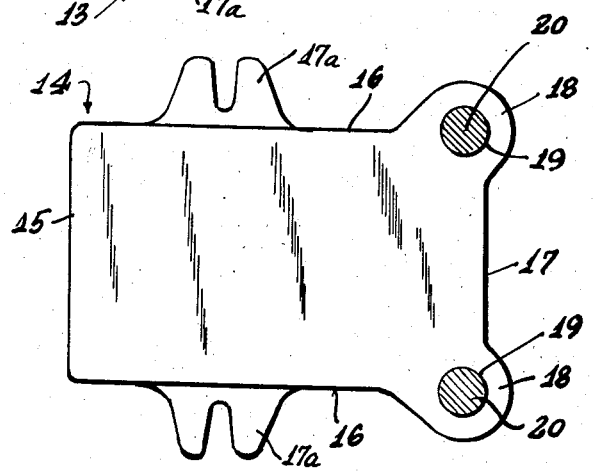
INVENTOR.
SIDNEY ROBERTS
BY
J.B.Felshin
ATTORNEY.

March 17, 1959 S. ROBERTS 2,877,672
DRILL PRESS JIGS AND ACCESSORIES THEREFOR
Filed Jan. 31, 1958 2 Sheets-Sheet 2

INVENTOR.
SIDNEY ROBERTS
BY
J.B. Felshin
ATTORNEY nited States Patent Office 2,877,672
Patented Mar. 17, 1959

2,877,672

DRILL PRESS JIGS AND ACCESSORIES THEREFOR

Sidney Roberts, Flushing, N. Y., assignor to Micromatic Machine Corp., Brooklyn, N. Y., a corporation of New York Application January 31, 1958, Serial No. 712,390

11 Claims. (Cl. 77—62)

This invention relates to drill press jigs and accessories therefor.

An object of this invention is to provide a device of the character described having means to hold down or clamp a work piece to be drilled, the structure including means to apply a spring pressure down on a jig top which presses down on the work piece, the structure further including means to increase the spring pressure as the drill spindle is depressed, the spring pressure remaining on the jig top as the drill is raised and extracted from the work, means being further supplied to release the jig top and pull it up above the work piece when the drill is fully raised, so as to release the work piece which can then be removed and replaced.

Another object of this invention is to provide a highly improved drill jig fixture which may be applied either to a single drill press or to a multiple drill press, and which shall be relatively inexpensive to manufacture, easy to apply and operate, and which shall yet be practical and efficient to a high degree in use.

Other objects of this invention will in part be obvious and in part hereinafter pointed out.

The invention accordingly consists in the features of construction, combination of elements, and arrangement of parts (and method steps), which will be exemplified in the construction hereinafter described, and of which the scope of invention will be indicated in the following claims.

In the accompanying drawings in which is shown various illustrative embodiments of this invention.

Fig. 1 is a side horizontal view of a drill jig fixture embodying the invention attached to a drill and clamping a work piece;

Fig. 2 is a cross-sectional view taken on line 2—2 of Fig. 1;

Fig. 3 is a cross-sectional view taken on line 3—3 of Fig. 1;

Fig. 4 is a cross-sectional view taken on line 4—4 of Fig. 1, illustrating the clamp;

Figure 5:
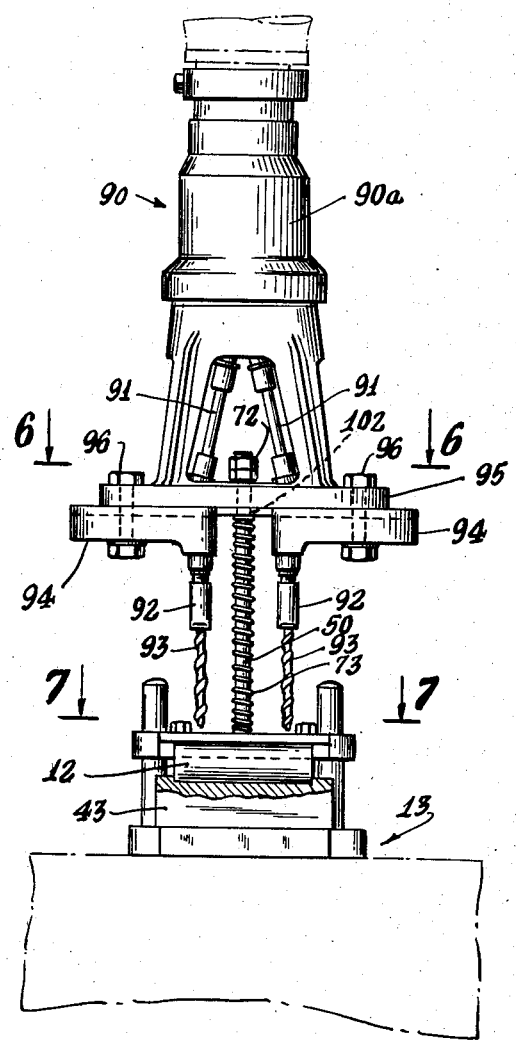
Fig. 5 is a front elevational view of a multiple drill provided with a drill jig fixture embodying the invention and showing the same applied to a work piece.

Referring now in detail to the drawing, 10 designates a drill jig embodying the invention attached to a drill press 11 and clamping the work piece 12. The jig 10 comprises a jig base 13. Said jig base 13 comprises a bottom plate 14 having a front edge 15, side edges 16 and a rear edge 17. Extending from the side edges 16 are slotted ears 17a to receive bolts for clamping the jig base to any suitable support. At the rear corners of the jig base are ears 18, vertically bored as at 19, to receive the lower edges of vertical guide pins 20 fixed therein.

Slideable on the guide pins 20 is a jig top 22. Said jig top 22 comprises a horizontal plate 23, having at its rear corners a pair of sleeves 24 slideably receiving the pins 20. The plate 23 has a front edge 25 and side edges 26. In its upper face, the plate 23 is depressed, forming a front shoulder 27 and a horizontal depressed surface 28. Mounted on the surface 28 is a jig plate 30, rectangular in shape. The plate 30 has a front edge 31 and side edges 32. It has a rear edge 33 abutting the front shoulder 27. The plate 30 may be fixed to the jig top 22 by means of studs 34, screwed through registering openings 35, 36, in the plate 30 and jig top 22, respectively.

The plate 30 may be pinned to plate 23 by suitable dowel pins 37. Plate 30 may be formed with an opening 40 receiving a hardened bushing 41 through which the drill bit 42 of the drill 11, may pass.

On the plate 14, may be placed a block or work holding fixture 43 provided with a groove 44 on which rests the work piece 12 to be drilled by the drill bit 42. The plate 30 is either made of hard steel or soft steel provided with a hard bushing 41.

Screwed within a threaded opening 46 in the plate 23 is a vertical lifter rod 50 projecting above said plate, as shown in Fig. 1 in the drawing.

The drill press 11 comprises a usual body or casting 51, carrying a pair of usual stop pads 52. The drill press further comprises a vertically slideable spindle 53 carrying the chuck 54 in which is clamped the drill bit 42.

It will be understood that in the usual operation of the drill press, a handle or wheel is actuated to lower or raise the spindle 53 together with the chuck 54 and the drill bit 42.

Clamped to the spindle 53 is a jig lifter clamp 60. The clamp 60 comprises a plate 61 formed with an opening 62 to receive the spindle 53. Plate 61 is formed with a radial split or slot 63 forming a pair of arms 64, 65, which may be drawn together by means of any suitable stud 66, screwed into the threaded opening 67 in arm 65, and passing through an opening 68 in the arm 64. Plate 61 has an extension 70 formed with a through opening 71 slideably receiving the lifter rod 50. Screwed to the upper end of rod 50 are lock nuts 72, spaced above the jig lifter clamp 60.

Receiving on the lifter rod 50 and interposed between the jig top 23 and the jig lifter clamp 60 is a coil compression clamp spring 73.

The clamp 60 is provided, at a point opposite to the split 63, with an ear 75 formed with a through opening 76. Fixed in said opening 76 is a vertical pin 80. Screwed to the upper end of the pin 80 are lock nuts 81. When the lock nuts 81 strike the pads 52, the limit of downward movement of the drill spindle is reached.

It will now be understood that as the spindle is lowered, the drill bit 42 will pass through the bushing 41 and drill an opening in the work piece 12. The spring 73 presses down on the jig top 22 which causes the plate 30 to press down on the work piece 12 for resiliently clamping said work piece against the work holder 43. As the spindle works downward, the spring 73 is progressively compressed to increase the clamping pressure on the work piece.

After the drilling operation is completed, the spindle will move upwardly, while retaining spring pressure on the work piece 12. However, when the drill bit 42 is fully extracted from the work piece and from the bushing 41, the tension of the spring may be reduced to zero. Further upward movement of the spindle will cause the clamp plate 60 to engage the lock nuts 72 for lifting the jig top 22 and hence the jig plate 30 above the work piece 12, so that the latter may be removed and replaced by a new work piece.

Figure 6:
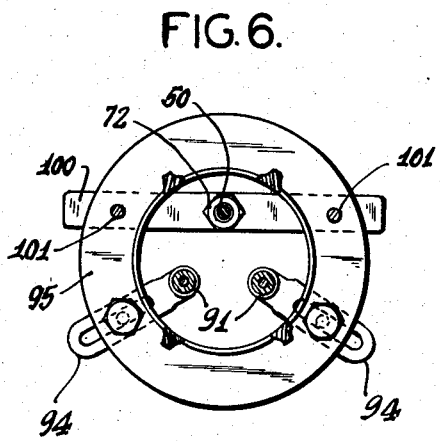
Fig. 6 is a cross-sectional view taken on line 6—6 of Fig. 5.
Figure 7:
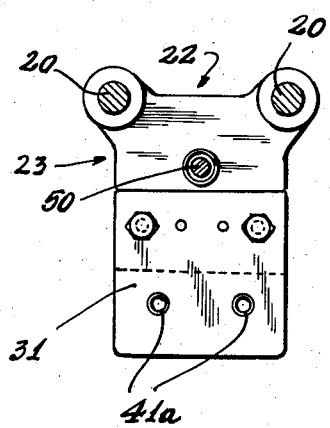
Fig. 7 is a cross-sectional view taken on line 7—7 of Fig. 5.

In Figs. 5, 6 and 7, there is shown the application of the inventive concept to a multiple drill press. The multiple drill press, is shown at 90 and may be of usual construction, being provided with a casting 90a fixed to move up and down with the spindle and comprising a plurality of individual spindles 91, connected through usual universal connections to chucks 92, in which are mounted the drill bits 93. The spindles may be supported in radial clamps 94 adjustably fixed to a ring 95 at the lower end of the casing 90a by bolts 96.

In Figs. 5 and 7, are shown the jig base 13, supporting the pins 20, the same as in Figs. 1-4, and supporting the work holding blocks 43, on which the work piece 12 is mounted. Also, there is slideably mounted on the pins 20, the jig top 22, provided with the jig plate 31, similar to the corresponding structure shown on Figs. 1-4. Also the plate 23 of the jig top 22 supports the lifter rod 50, having the lock nuts 72 at its upper ends.

In accordance with the present invention, a horizontal bar 100, is fixed to the under side of the ring 95 by means of any suitable bolts 101. The bar 100 is formed with a central opening 102 through which the rod 50 passes. A coil compression spring 73 is interposed between the plate 23 and the bar 100 and is likewise mounted on the rod 50. The plate 31 will be provided with a pair of bushings 41a (instead of with a single bushing) to receive the drill bits 93.

Here, likewise, when the spindle is lowered the spring 73 will be gradually compressed, and after the drill bits are extracted from the work piece, the bar 100 will engage the lock nuts 72 to lift the jig top 22 and the plate 31 for releasing the work piece.

It will thus be seen that there is provided an apparatus in which the several objects of this invention are achieved and which is well adapted to meet the condition of practical use.

As possible embodiments might be made of the above invention, and as various changes might be made in the embodiment above set forth, it is to be understood that all matter herein set forth or shown in the accompanying drawings is to be interpreted as illustrative and not in a limiting sense.

I claim:

1. In combination, a jig base provided with a pair of upstanding pins, a jig top slideable on said pins, means on said jig top to engage a work piece supported on the jig base, a rod fixed to the jig top and extending upwardly therefrom, a member provided with clamp means for attachment to a portion of a drill press movable up and down with the spindle and formed with an opening slideably receiving said rod, spring means interposed between said jig top and member, and a stop on the rod spaced above said member, said jig top being slidably engaged with said pins when said member is lifted by the spindle into engagement with said stop.

2. The combination of claim 1, wherein said spring means comprises a coil compression spring mounted on said rod.

3. The combination of claim 2, in combination with a pin fixed to said member and extending upwardly therefrom and provided with stop means to engage stop pads on the body of the drill press.

4. In combination, a jig base, a pair of parallel, vertical guide pins fixed to the jig base and extending upwardly therefrom, a work holding fixture on the jig base, a jig top having sleeves, slidably receiving said guide pins, said jig top having a depressed upper surface, a jig plate mounted on said depressed surface and extending forwardly therefrom, means to fix said jig plate to said jig top, said jig plate being formed with an opening to receive a drill bit for drilling a work piece on the work holding fixture, a vertical rod equally spaced from said pins and having its lower end fixed to the jig top and extending upwardly therefrom, a member having at one end an opening receiving said rod, a coil compression spring on said rod and interposed between said jig top and member and lock nuts screwed to the upper end of said rod said and disposed above said member.

5. The combination of claim 4, said member having at its other end means for clamping attachment to the spindle of a drill press.

6. The combination of claim 5, in combination with a vertical pin fixed to said member adjacent the clamping end of said member and extending upwardly therefrom, and provided with adjustable stop means adjacent its upper end to engage stop pads on the body of the drill press.

7. In combination, a base, a pair of parallel vertical pins fixed to and extending upwardly from one end of the base, a jig top having openings slidably receiving said pins, and being spaced above the base, a vertical guide pin having its lower end fixed to the jig top and being spaced between said pair of fixed pins, a clamp member having at one end an opening slidably receiving said upstanding guide pin, a coil compression spring interposed between said clamp member and said jig top, said clamp member extending horizontally in spaced relation above the jig top, and being formed with a split clamp portion forming an opening for receiving an attachment to a portion of the drill press, which moves up and down with the spindle of the drill press.

8. The combination of claim 7, a line extending from the center of the clamp opening to the center of the guide pin being perpendicular to a line interconnecting said pair of upstanding pins on the base.

9. The combination of claim 8, said clamp member being formed with an opening offset from the clamp opening, a pin having its lower end fixed to said offset opening and extending upwardly therefrom, and a nut screwed to the upper end of said last-mentioned pin.

10. The combination of claim 9, said jig top comprising a plate having a downwardly recessed top surface forming a shoulder, and a jig top plate mounted on said recessed surface for contacting said shoulder and being formed with an opening to receive a drill.

11. The combination of claim 10, in combination with means on the base and beneath the opening of the jig top plate on which to mount a workpiece to be drilled.

References Cited in the file of this patent

UNITED STATES PATENTS

| | | |
|---|---|---|
| 1,159,196 | Eden | Nov. 2, 1915 |
| 2,360,921 | Wiken | Oct. 24, 1944 |